United States Patent
Benner et al.

(10) Patent No.: US 9,598,056 B2
(45) Date of Patent: Mar. 21, 2017

(54) ADAPTER FOR WIPER AND WIPER SYSTEM THEREOF

(71) Applicant: Unipoint Electric Mfg. Co. Ltd., Taipei (TW)

(72) Inventors: Andreas Benner, Taipei (TW); Sam Lai, Taipei (TW); Irving Chiu, Taipei (TW); Hsuhui Huang, Taipei (TW); Chienhung Lai, Taipei (TW)

(73) Assignee: Unipoint Electric Mfg. Co. Ltd., Taipei (TW)

( * ) Notice: Subject to any disclaimer, the term of this patent is extended or adjusted under 35 U.S.C. 154(b) by 267 days.

(21) Appl. No.: 14/447,785

(22) Filed: Jul. 31, 2014

(65) Prior Publication Data

US 2015/0033493 A1 Feb. 5, 2015

(30) Foreign Application Priority Data

Jul. 31, 2013 (CN) .......................... 2013 1 0329858

(51) Int. Cl.
*B60S 1/40* (2006.01)
*B60S 1/38* (2006.01)

(52) U.S. Cl.
CPC ............. *B60S 1/4038* (2013.01); *B60S 1/387* (2013.01); *B60S 1/407* (2013.01); *B60S 1/4041* (2013.01); *B60S 1/4067* (2013.01); *B60S 2001/4058* (2013.01)

(58) Field of Classification Search
CPC ...... B60S 1/387; B60S 1/4038; B60S 1/4074; B60S 1/4077

USPC .......................................... 15/250.31, 250.32
See application file for complete search history.

(56) References Cited

U.S. PATENT DOCUMENTS

| | | | |
|---|---|---|---|
| 8,490,239 B2 * | 7/2013 | Ehde | B60S 1/4038 15/250.32 |
| 9,174,611 B2 * | 11/2015 | Tolentino | B60S 1/4003 |
| 2006/0130263 A1 * | 6/2006 | Coughlin | B60S 1/40 15/250.32 |
| 2010/0186184 A1 * | 7/2010 | Lee | B60S 1/387 15/250.32 |
| 2010/0212101 A1 * | 8/2010 | Thienard | B60S 1/3868 15/250.32 |
| 2012/0060316 A1 * | 3/2012 | Avasiloaie | B60S 1/381 15/250.33 |
| 2014/0259505 A1 * | 9/2014 | Fournier | B60S 1/4003 15/250.32 |

FOREIGN PATENT DOCUMENTS

WO    WO 2005039944 A1 *    5/2005    ............ B60S 1/3868

* cited by examiner

*Primary Examiner* — Michael Jennings
(74) *Attorney, Agent, or Firm* — Michael Best & Friedrich LLP (57) ABSTRACT

A wiper adapter detachably coupled between a wiper arm and a wiper having a pivot shaft, the adapter comprises a first coupling element and a second coupling element. The first coupling element has a shaft cavity provided with a notch that is in communication with the shaft cavity; the pivot shaft can be assembled into the shaft cavity radially through the notch and can pivotably fit in the shaft cavity. The second coupling element can snap to the pivot shaft so as to prevent the pivot shaft from leaving the shaft cavity through the notch.

14 Claims, 7 Drawing Sheets

ADAPTER FOR WIPER AND WIPER SYSTEM THEREOF

BACKGROUND OF THE INVENTION

The invention relates to the field of adapter for wiper and wiper system thereof, in particularly, to adapter for wiper and wiper system thereof that can provide multi-directional fixing forces to tighten the wiper structure and to improve the wiping efficiency of the wiper.

Generally, wiper comprises wiper rod, wiper arm is connected to the wiper rod by means of connecting portion on the wiper rod that is coupled with adapter, the wiper arm may activate the wiper rod connecting to the wiper arm via a driving component, so as to enable the wiper to wipe a windshield. In other words, the vehicle wiper device is typically assembled adjacent to vehicle windshield, the wiper blade of the wiper reciprocates within an arch wiper region, while wiper rubber is used to remove depositions such as dust or water stain, etc., for example, rain water or snowflake that adheres to the windshield.

However, in existing wiper structure, since the adapter on the wiper for cooperating with the connecting portion rod only has fixing force in one fixing direction, that is, when the wiper has experienced multiple times of usage or the wiper is suddenly subjected to overwhelming wind pressure, the joint of the connecting portion and the adapter may therefore loosen, thus causing damage to the wiper structure and reducing the wiping efficiency of the wiper system.

SUMMARY OF THE INVENTION

The embodiments of the invention to be described hereinafter are directed to an adapter for wiper and a wiper system thereof, which have substantively overcome one or more problems caused by the limitations and deficiencies in the prior art.

One object of the invention is to provide an adapter for wiper which can be detachably coupled between a wiper arm and a wiper having a pivot shaft, wherein the adapter comprises a first coupling element and a second coupling element. The first coupling element has a shaft cavity provided with a notch that is in communication with said shaft cavity, the pivot shaft can be assembled into the shaft cavity radially through the notch and can pivotably fit in the shaft cavity. The second coupling element can snap to the pivot shaft which fits in the shaft cavity so as to prevent the pivot shaft from leaving the shaft cavity through the notch.

Preferably, the second coupling element is provided with an elastic arm and a snapping piece located at a tip end accessory of the elastic arm, and the snapping piece snaps to an axial end of the pivot shaft which fits in the shaft cavity.

Preferably, the axial end of the pivot shaft has a snapping opening, the snapping piece of the second coupling element snaps in the snapping opening of the axial end of the pivot shaft which fits in the shaft cavity, and the second coupling element can move along the axial direction of the pivot shaft when the elastic arm deforms elastically.

Preferably, the snapping piece is provided with a guide portion which faces the snapping opening, the guide portion extends in the direction from one end of the snapping piece towards the snapping opening, the guide portion can radially guide the snapping piece to snap in the snapping opening of the axial end of the pivot shaft which fits in the shaft cavity through the snapping opening of the axial end of the pivot shaft.

Preferably, the snapping piece is provided with a block portion which is a side wall facing the snapping opening, the block portion is provided at the other end of the snapping piece opposite to the guide portion, and the block portion is approximately perpendicular to the elastic arm.

Preferably, the snapping piece is provided with a block portion which is formed by extending in a direction approximately perpendicular to the direction in which the elastic arm extends and bending towards the guide portion in arc fashion, such that the block portion has arc structure.

Preferably, the second coupling element is provided with a plurality of elastic arms and snapping pieces connected to the elastic arms, the middle portion of the pivot shaft is provided with a snapping opening which extends into the pivot shaft in the radial direction, the snapping piece snaps in the snapping opening of the pivot shaft which fits in the shaft cavity.

Preferably, the snapping piece includes a guide portion and a block portion adjacent to the guide portion, the guide portion has arc structure which is formed by bending an end of the snapping piece towards the block portion in arc fashion, the block portion has arc structure recessing towards the center of the snapping opening and the direction in which the elastic arm extends.

Preferably, the second coupling element can move radially along the pivot shaft when the elastic arm deforms elastically.

Another object of the invention is to provide a wiper system which comprises a wiper, a wiper arm and aforementioned adapter which is detachably coupled between the wiper and the wiper arm.

Yet another object of the invention is to provide a wiper assembly which can be used in cooperation with a wiper arm, which comprises a wiper and aforementioned adapter which can be detachably coupled between the wiper and the wiper arm.

In order to enable the Examiner to obtain better comprehension and understanding to the technical features of the invention and the achieved effects, the preferred embodiments of the invention with description in detail will be provided hereinafter.

DETAILED DESCRIPTION

The embodiments will be described in more details hereinafter with reference to the accompanying drawings; however, all the embodiments can be implemented in different formation and should not be regarded as being merely limited to the embodiments disclosed herein. More specifically, the embodiments are used to make this disclosure more thorough and complete, and to be able to fully convey the scope of the invention to those skilled in the art.

Figure 1:
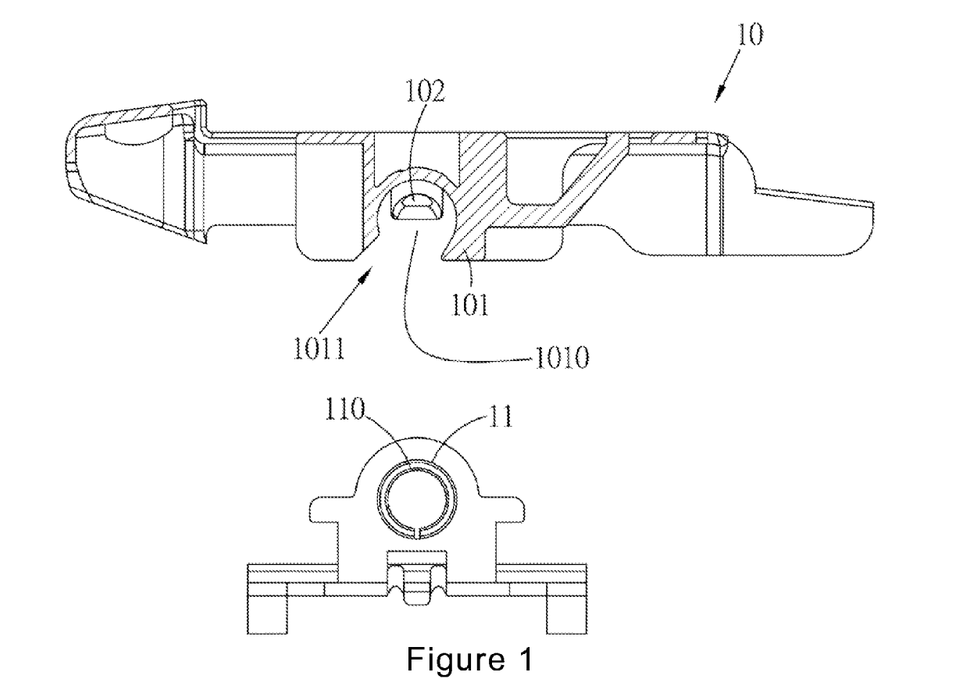
FIG. 1 is a schematic view of an adapter for wiper and a connector of a wiper according to a first embodiment of the invention before they are assembled.
Figure 2:
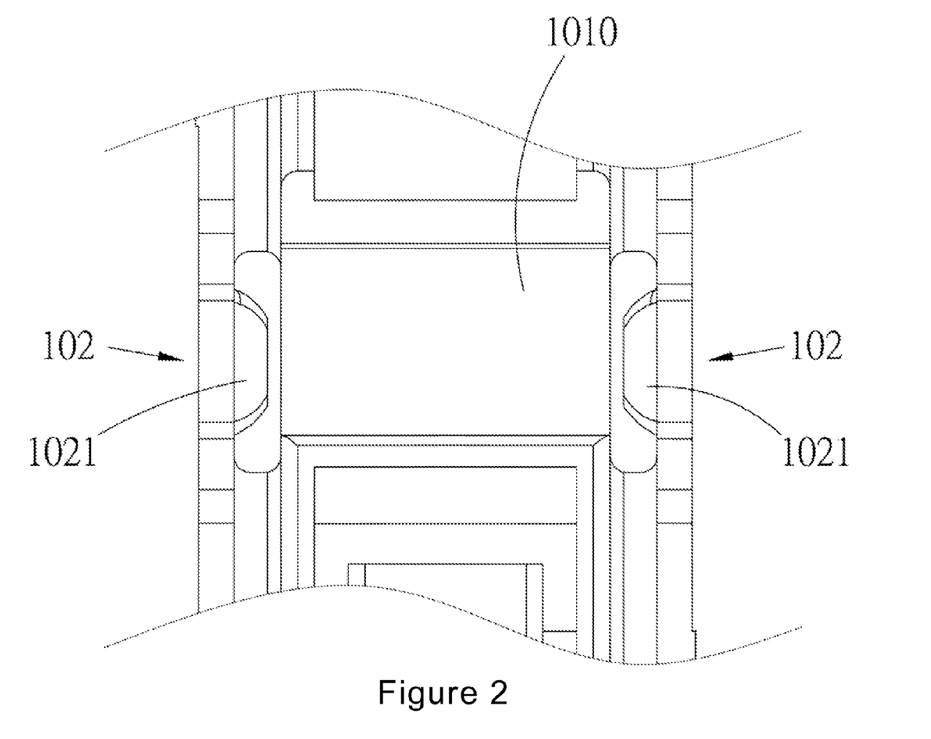
FIG. 2 is a partial schematic view seen from the bottom of the adapter for wiper shown in FIG. 1.

Referring to FIGS. 1 and 2, FIG. 1 is a schematic view of an adapter for wiper and a connector of a wiper according to the invention before they are assembled, and FIG. 2 is a partial schematic view seen from the bottom of the adapter for wiper shown in FIG. 1. As shown in FIG. 1, the adapter for wiper 10 can be detachably coupled between a wiper arm (not depicted in the figure) and a wiper having a pivot shaft 11. The adapter for wiper 10 includes a first coupling element 101 and a second coupling element 102. Wherein the first coupling element 101 has a shaft cavity 1010, and said shaft cavity 1010 is provided with a notch 1011 in communication with said shaft cavity 1010. With the arrangement of the notch 1011, the pivot shaft 11 can be assembled into the shaft cavity 1010 in the radial direction through the notch 1011 such that the pivot shaft 11 pivotably fits in the shaft cavity 1010. At this time, the second coupling element 102 can be detachably snapped on the pivot shaft 11 which has already fit in the shaft cavity 1010 so as to limit the degree of freedom of the pivot shaft 11 in the shaft cavity 1010 in the radial direction, thereby prevent the pivot shaft 11 from leaving the shaft cavity 1010 through the notch 1011.

Figure 3:
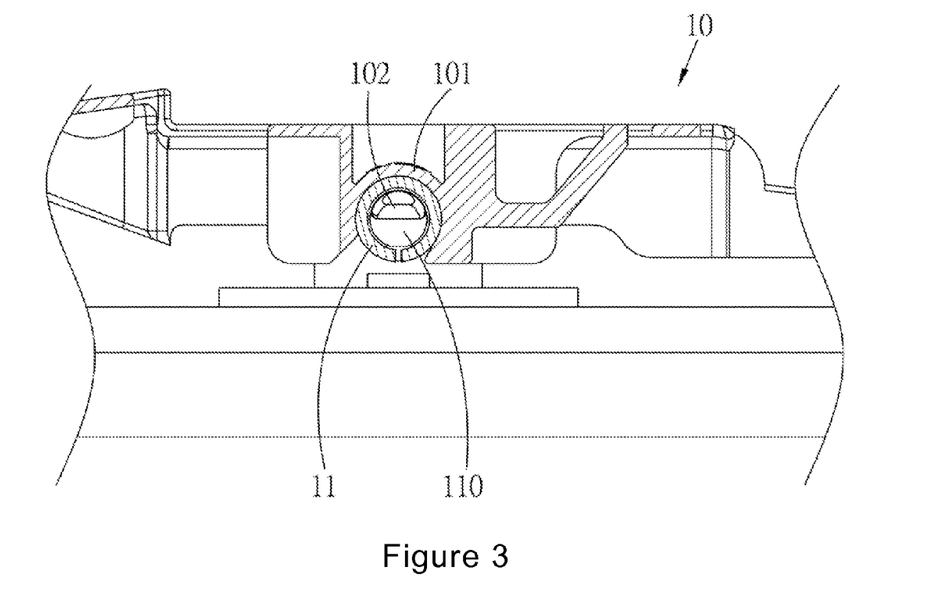
FIG. 3 is a partial schematic sectional view of the adapter for wiper and the connector of the wiper shown in FIG. 1 after they are assembled together.
Figure 4:
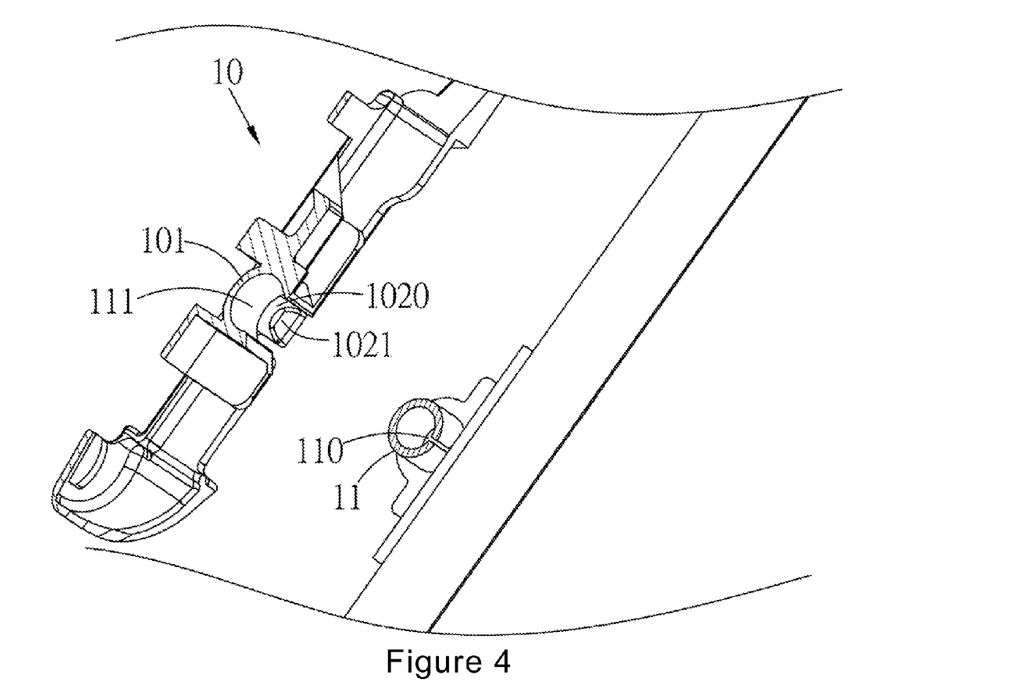
FIG. 4 is a partial schematic sectional view of the adapter for wiper and the connector of the wiper shown in FIG. 1 before they are assembled.

Further referring to FIGS. 3 and 4 in combination with FIGS. 1 and 2. FIG. 3 is a partial schematic sectional view of the adapter for wiper and the connector of the wiper shown in FIG. 1 after they are assembled together. FIG. 4 is a partial schematic sectional view of the adapter for wiper and the connector of the wiper shown in FIG. 1 before they are assembled. Specifically, the pivot shaft 11 of the wiper can be of tubular structure, while the profile of the shaft cavity 1010 is provided to be a circular shape corresponding to the pivot shaft 11, and the diameter size of the shaft cavity 1010 can just accommodate the pivot shaft 11, thereby the pivot shaft 11 can pivotally rotate within the shaft cavity 1010. In addition, the second coupling element 102 can be provided at one end or both ends of the shaft cavity 1010 in the axial direction. That is, when the pivot shaft 11 fits in the shaft cavity 1010, the second coupling element 102 snaps on tube opening of one end or both ends of the pivot shaft 11 that is of tubular structure, i.e., one or both of the axial ends 110 of the pivot shaft 11. In the following embodiments, unless otherwise stated, the second coupling element 102 of the embodiment employs two second coupling elements 102 as the way of implementation to facilitate the description, thereby any equivalent modification without departing from the spirit of the claims of the invention should be included within the invention, therefore, the invention should not be limited by any specific embodiment.

It is worth noting that the second coupling element 102 further includes an elastic arm 1020 and a snapping piece 1021 located at a tip end accessory of the elastic arm 1020. Wherein one end of the elastic arm 1020 is connected to the first coupling element 101, while the other end of the elastic arm 1020 is connected to the snapping piece 1021, as shown in FIG. 1 or FIG. 4. When the pivot shaft 11 is assembled into the shaft cavity 1010 of the first coupling element 101, since the snapping piece 1021 abuts against an outer wall of the pivot shaft 11 at the axial end 110 or a wiper pivot shaft fixing portion for fixing the pivot shaft 11, such that the elastic arm 1020 deforms elastically, at this time, the snapping piece 1021 of the second coupling element 102 can move along the axial direction of the pivot shaft 11. When the snapping piece 1021 displaces to the snapping opening of the axial end 110, since the abutment force disappears, the snapping piece 1021 can snap to the snapping opening of the axial end 110 by the elastic restore force. Simply speaking, the second coupling element 102 may be an elastic element, so that the second coupling element 102 may be detachably snapped to the pivot shaft 11. Incidentally, in a preferred embodiment, the size of the notch 1011 can be set to be slightly smaller than the size of the outer diameter of the pivot shaft 11, such that when the pivot shaft 11 is assembled, the pivot shaft 11 can force the notch 1011 to generate elastic deformation, thus temporarily increasing its size, when the pivot shaft 11 has already been accommodated in the shaft cavity 1010, the notch 1011 will resume to the original size, also in this way, the pivot shaft 11 may be further prevented from leaving the shaft cavity 1010 through the notch 1011.

Figure 5:
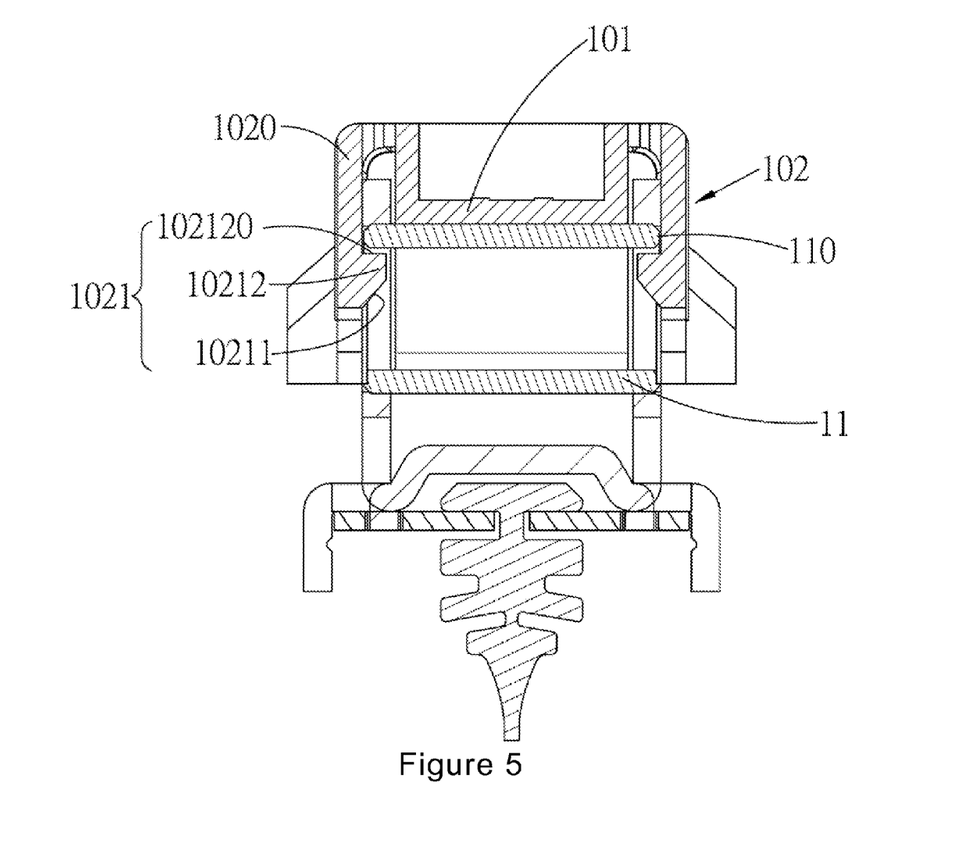
FIG. 5 is a schematic sectional view of the adapter for wiper and the connector of the wiper shown in FIG. 1 after they are assembled together.

Further referring to FIG. 5, FIG. 5 is a schematic sectional view of the adapter for wiper and the connector of the wiper shown in FIG. 1 after they are assembled together. With further respect to the second coupling element 102, the snapping piece 1021 of the second coupling element 102 can be provided with a guide portion 10211 and a block portion 10212. Wherein the guide portion 10211 is a snapping opening facing the axial end 110, the guide portion 10211 extends in the direction from one end of the snapping piece 1021 towards the snapping opening of the axial end 110, the guide portion 10211 can guide the snapping piece 1021 radially to snap in the snapping opening of the axial end 110 through the snapping opening of the axial end 110. The block portion 10212 is a side wall facing the snapping opening of the axial end 110, the block portion 10212 is provided at the other end of the snapping piece of the axial end 110 opposite to the guide portion 10211, and the block portion 10212 is approximately perpendicular to the elastic arm 1020.

That is, the guide portion 10211 is provided at a side wall facing the snapping opening of the axial end 110, and is located at one end of the snapping piece 1021 which is far away from the joint of the elastic arm 1020 and the snapping piece 1021. The guide portion 10211 has an inclined surface inclining in the direction from said end of the snapping piece 1021 towards the snapping opening of the axial end 110 and the joint of the elastic arm 1020 and the snapping piece 1021. In addition, the block portion 10212 is also provided at the side wall facing the snapping opening of the axial end 110, and is located adjacent to where the elastic arm 1020 connects to the snapping piece 1021, and the block portion 10212 has a block face 102120 which is connected to the elastic arm 1020 and is approximately perpendicular to the elastic arm 102, and a connecting face which is connected between the block face 102120 and the guide portion 10211. It is worth noting that the block face 102120 may be set to be more corresponding to the shape of the inner wall of the snapping opening of the axial end 110. For example, when the pivot shaft 11 is of tubular structure, then the block face 102120 is an arc face corresponding to the arc radius of the inner wall of the pivot shaft 11. I.e., as shown in FIG. 3. In this way, the pivot shaft 11 is facilitated to pivotably fit in the shaft cavity 1010.

Figure 6:
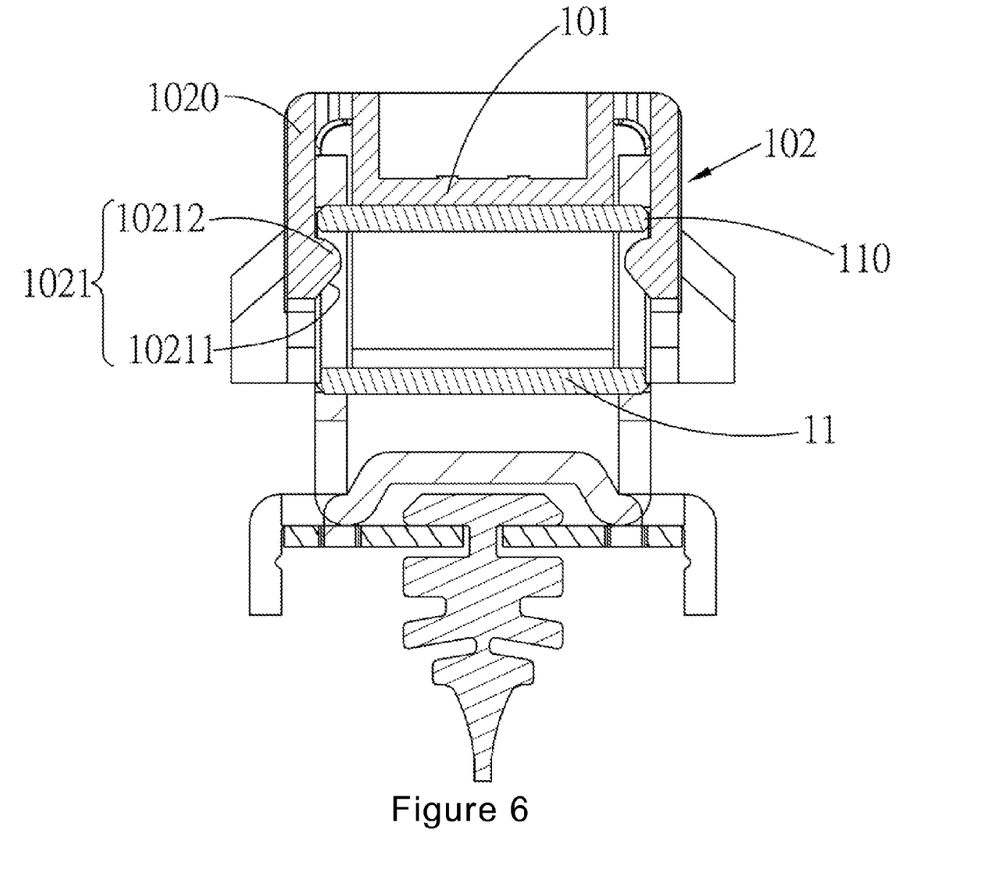
FIG. 6 is a schematic sectional view of the adapter for wiper and the connector of the wiper according to a second embodiment of the invention after they are assembled together.

Referring now to FIG. 6, FIG. 6 is a schematic sectional view of the adapter for wiper and the connector of the wiper according to a second embodiment of the invention after they are assembled together. Since the principal architecture of FIG. 6 is the same as that of FIG. 5, thereby the connecting and acting relationship between identical or similar members will not be described repeatedly. FIG. 6 differs from FIG. 5 in that FIG. 6 uses another embodiment of the block portion 10212 of the snapping piece 1021. In this embodiment, the block portion 10212 extends from where the elastic arm 1020 and the snapping piece 1021 joints and in a direction approximately perpendicular to the direction in which the elastic arm 1020 extends, and bends towards the guide portion 10211 in arc fashion so as to connect with the guide portion 10211. Simply speaking, unlike the block portion 10212 in the previous embodiment, which is connected between the elastic arm 1020 and the guide portion 10211 at vertical angle, the block portion 10212 in this embodiment is connected between the elastic arm 1020 and the guide portion 10211 in arc structure. Incidentally, the block portion 10212 can further be set to be corresponding to the shape of the inner wall of the snapping opening of the axial end 110.

The arrangement of the block portion 10212 in this embodiment can introduce the effect of facilitating the user to disassemble. When the user intends to detach the adapter for wiper 10 from the pivot shaft 11, the arc-shaped block portion 10212 will abut against the snapping opening of the axial end 110, so as to follow the arc-shaped block portion 10212 and easily force the elastic arm 1020 to generate exact elastic deformation as that at the time of assembling, therefore, the block portion 10212 of the snapping piece 1021 may detach from the snapping opening of the axial end 110 with less effort, thereby the action of detachment is completed.

Figure 7:
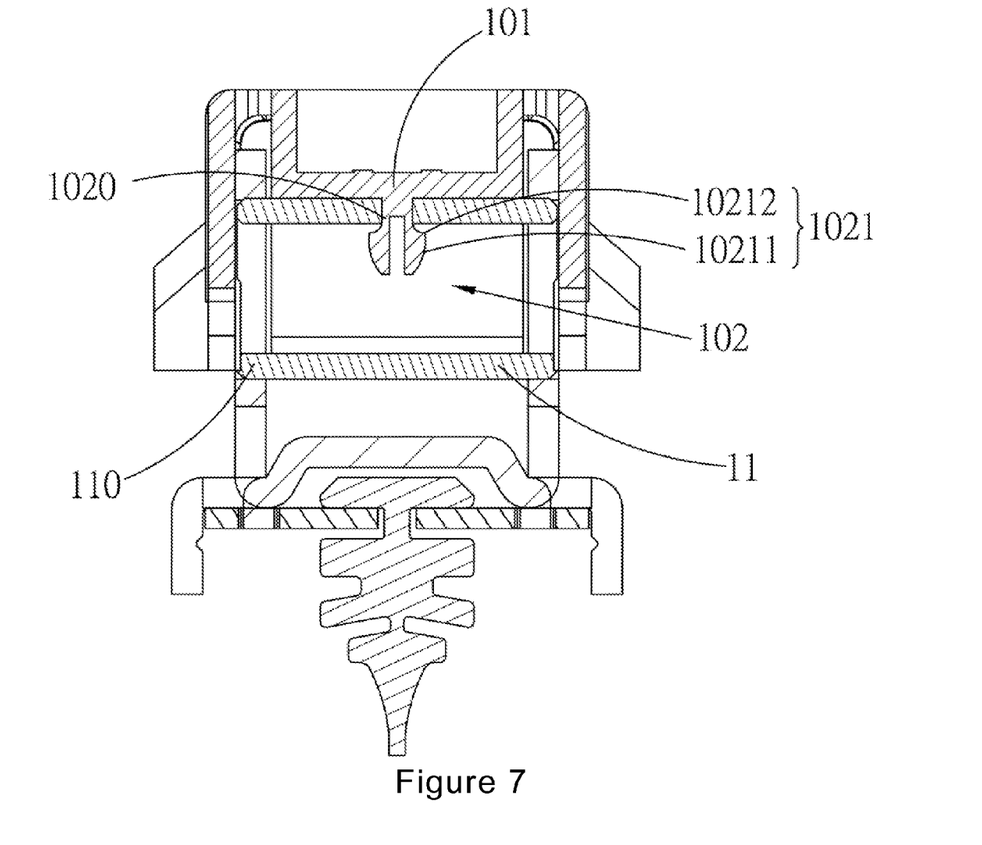
FIG. 7 is a schematic sectional view of the adapter for wiper and the connector of the wiper according to a third embodiment of the invention after they are assembled together.

Referring to FIG. 7, FIG. 7 is a schematic sectional view of the adapter for wiper and the connector of the wiper according to a third embodiment of the invention after they are assembled together. The principal architecture of this embodiment is the similar to that of the above two embodiments, thereby the connecting and acting relationship between identical or similar assemblies will not be described repeatedly. The principal difference of FIG. 7 lies in that one second coupling element 102 is employed in this embodiment. In this embodiment, an additional snapping opening may be provided above the pivot shaft 11, such that one second coupling element 102 may extend therethrough, so as to fix the adapter for wiper 10 to the pivot shaft 11.

Specifically, the snapping opening is provided on the middle section of the pivot shaft 11 and extends into the pivot shaft 11 in the radial direction, while the second coupling element 102 comprises a plurality of elastic arms 1020 and snapping pieces 1021 connected to each of the elastic arms 1020, respectively, thereby the second coupling element 102 snaps to the snapping opening of the pivot shaft 11 which fits in the shaft cavity 1010 by way of the snapping piece 1021. Wherein the snapping piece 1021 includes a guide portion 10211 and a block portion 10212 connected to the guide portion 10211. The guide portion 10211 is an arc structure formed by one end of the snapping piece 1021, which extends away from a joint of the elastic arm 1020 and the snapping piece 1021, bending towards the block portion 10212 in arc fashion, while the block portion 10212 is an arc structure recessing towards the center of the snapping opening and the direction in which the elastic arm 1020 extends. On the other hand, the number of elastic arms 1020 and two snapping pieces 1021 is set by two as an example state, when the second coupling element 102 is viewed in the front, the profile of the snapping piece 1021 may be the shape of two opposite sectors with approximately semicircle shape. Also, when the second coupling element 102 intends to pass through the snapping opening, the guide portion 10211 and the snapping opening will abut against each other, such that the elastic arm 1020 deforms elastically, thereby displacing the two snapping pieces 1021 towards the axle center of the snapping opening, such that the size of the second coupling element 102 is temporarily reduced to enable the second coupling element 102 to pass through the snapping opening. Similarly, when the abutment force of the snapping opening and the snapping piece 1021 disappears, then the elastic arm 1020 elastically resumes to the original state, thereby the snapping piece 1021 may snap in the snapping opening.

In addition, the wiper system provided by the invention may comprise a wiper, a wiper arm and the adapter of aforementioned embodiments that can be detachably coupled between the wiper and the wiper arm.

Comparing to the prior art, this adapter for wiper has good practical applicability. And the adapter for wiper enables user to conveniently assemble the adapter for wiper with an existing wiper rod without being limited by angle, and when it is required to conduct the action of detaching the adapter for wiper from a wiper connecting portion, only at least one second coupling element of the adapters has to be actuated to easily separate the wiper connecting portion and the adapter, providing considerable convenience for either assembling or disassembling. Moreover, since the second coupling element is an element of elastic material, buffering is required both in conducting assembling and disassembling of the adapter for wiper and the wiper connecting portion, thus greatly reduce damage caused in assembling or disassembling. However, the adapter for wiper and wiper system thereof of the invention can provide not only the aforementioned embodiments which are merely preferred embodiments, but the relevant structures and applications of wiper, to which this adapter for wiper can be provided for assembling, should not be limited by aforementioned embodiments.

The above description is merely provided as example rather than limitation. Any equivalent modifications or variations made to the invention without departing from the spirit and scope of this invention should be included in the appended claims.

Notes of Reference Numbers 10 adapter for wiper
101 first coupling element
1010 shaft cavity
1011 notch
102 second coupling element
1020 elastic arm
1021 snapping piece
10211 guide portion
10212 block portion
102120 block face
11 pivot shaft
110 axial end

What is claimed is:
1. A wiper adapter which can be detachably coupled between a
  wiper arm and a wiper having a pivot shaft, characterized in that the adapter comprises:
  a first coupling element, which has a shaft cavity provided with a notch that is in communication with the shaft cavity, wherein the pivot shaft is configured to be assembled into the shaft cavity radially through the notch and pivotably fit in the shaft cavity; and a second coupling element, which is configured to snap into a hollow interior of the pivot shaft so as to prevent the pivot shaft from leaving the shaft cavity through the notch, wherein the second coupling element is provided with an elastic arm and a snapping piece located at a tip end accessory of the elastic arm, and the snapping piece snaps to an axial end of the pivot shaft;

wherein the axial end of the pivot shaft has a snapping opening, the snapping piece of the second coupling element snaps in the snapping opening of the axial end of the pivot shaft, and the second coupling element is configured to move along the axial direction of the pivot shaft when the elastic arm deforms elastically; and wherein the snapping piece is provided with a guide portion which faces the snapping opening, the guide portion extends in a direction from one end of the snapping piece towards the snapping opening, the guide portion is configured to radially guide the snapping piece to snap in the snapping opening of the axial end of the pivot shaft through the snapping opening of the axial end of the pivot shaft.

2. The wiper adapter according to claim 1, characterized in that the snapping piece is provided with a block portion which is a side wall facing the snapping opening, the block portion is provided at the other end of the snapping piece opposite to the guide portion, and the block portion is approximately perpendicular to the elastic arm.

3. The wiper adapter according to claim 1, characterized in that the snapping piece is provided with a block portion which is formed by extending in a direction approximately perpendicular to a direction in which the elastic arm extends and bending towards the guide portion in arc fashion, such that the block portion has arc structure.

4. The wiper adapter according to claim 1, characterized in that the second coupling element is provided with a plurality of elastic arms and snapping pieces connected to the elastic arms, a middle portion of the pivot shaft is provided with a snapping opening which extends into the pivot shaft in a radial direction, and the snapping piece snaps in the snapping opening of the pivot shaft.

5. The wiper adapter according to claim 4, characterized in that the snapping piece includes a guide portion and a block portion adjacent to the guide portion, the guide portion has arc structure which is formed by bending one end of the snapping piece towards the block portion in arc fashion, and the block portion has arc structure recessing towards the center of the snapping opening and a direction in which the elastic arm extends.

6. The wiper adapter according to claim 1, further comprising: a wiper.

7. A wiper system, characterized by comprising:
a wiper having a pivot shaft;
a wiper arm; and
a wiper adapter which is configured to be detachably coupled between the wiper arm and the wiper, characterized in that the adapter comprises:

a first coupling element, which has a shaft cavity provided with a notch that is in communication with the shaft cavity, wherein the pivot shaft is configured to be assembled into the shaft cavity radially through the notch and pivotably fit in the shaft cavity; and a second coupling element, which is configured to snap into a hollow interior of the pivot shaft so as to prevent the pivot shaft from leaving the shaft cavity through the notch.

8. The wiper assembly according to claim 7, characterized in that the second coupling element is provided with an elastic arm and a snapping piece located at a tip end accessory of the elastic arm, and the snapping piece snaps to an axial end of the pivot shaft.

9. The wiper assembly according to claim 8, characterized in that the axial end of the pivot shaft has a snapping opening, the snapping piece of the second coupling element snaps in the snapping opening of the axial end of the pivot shaft, and the second coupling element is configured to move along the axial direction of the pivot shaft when the elastic arm deforms elastically.

10. The wiper assembly according to claim 9, characterized in that the snapping piece is provided with a guide portion which faces the snapping opening, the guide portion extends in a direction from one end of the snapping piece towards the snapping opening, the guide portion is configured to radially guide the snapping piece to snap in the snapping opening of the axial end of the pivot shaft through the snapping opening of the axial end of the pivot shaft.

11. The wiper assembly according to claim 10, characterized in that the snapping piece is provided with a block portion which is a side wall facing the snapping opening, the block portion is provided at the other end of the snapping piece opposite to the guide portion, and the block portion is approximately perpendicular to the elastic arm.

12. The wiper assembly according to claim 10, characterized in that the snapping piece is provided with a block portion which is formed by extending in a direction approximately perpendicular to a direction in which the elastic arm extends and bending towards the guide portion in arc fashion, such that the block portion has arc structure.

13. The wiper assembly according to claim 7, characterized in that the second coupling element is provided with a plurality of elastic arms and snapping pieces connected to the elastic arms, a middle portion of the pivot shaft is provided with a snapping opening which extends into the pivot shaft in a radial direction, and the snapping piece snaps in the snapping opening of the pivot shaft.

14. The wiper assembly according to claim 13, characterized in that the snapping piece includes a guide portion and a block portion adjacent to the guide portion, the guide portion has arc structure which is formed by bending one end of the snapping piece towards the block portion in arc fashion, and the block portion has arc structure recessing towards the center of the snapping opening and a direction in which the elastic arm extends.

* * * * *